(No Model.)
W. WALKER.
PROCESS OF AND APPARATUS FOR MAKING SILICATES AND HYDROCHLORIC ACID.
No. 474,539. Patented May 10, 1892.
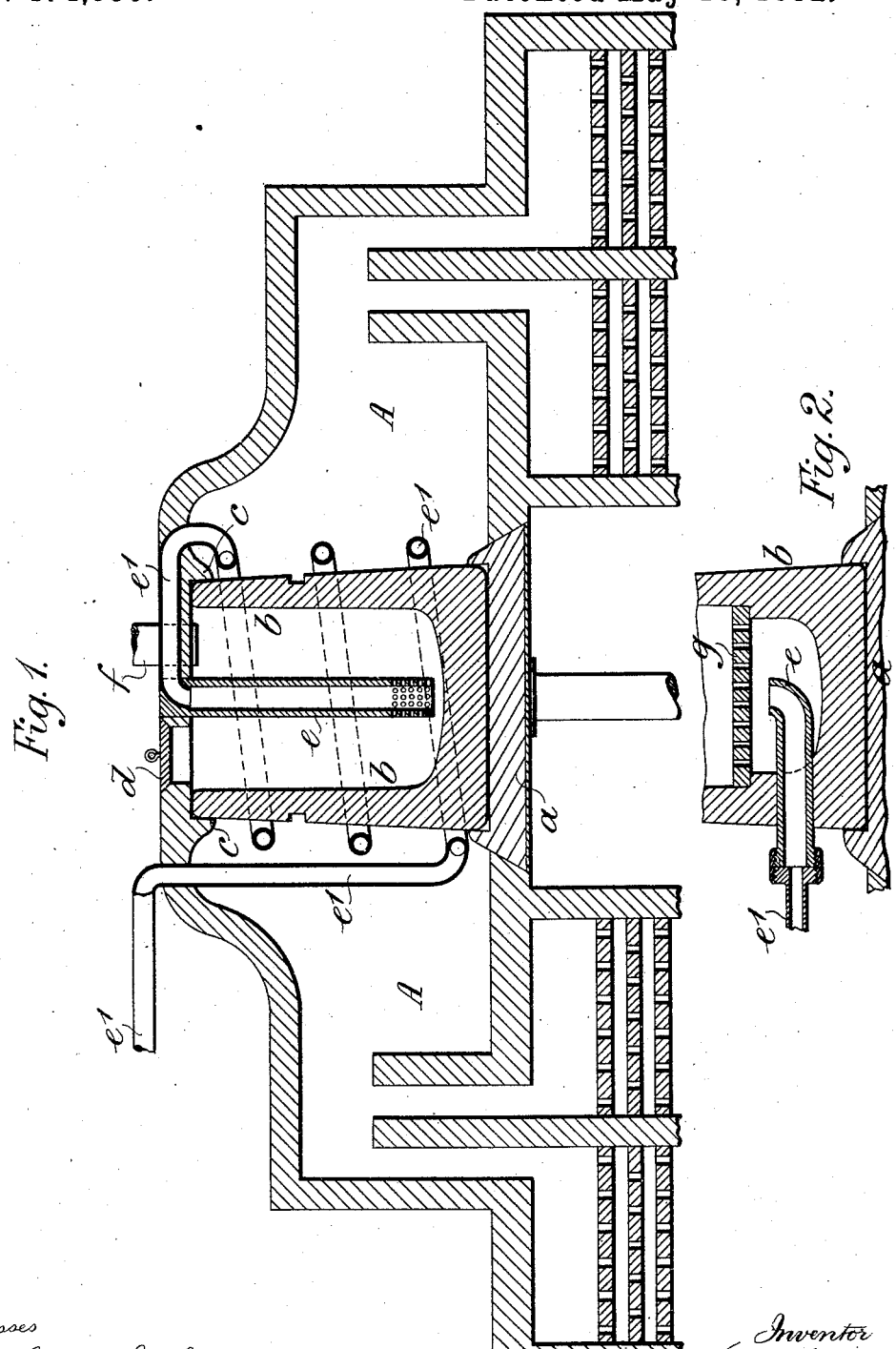
Witnesses
Chas H. Smith
J. Staib
Inventor
Walter Walker
for Lemuel W. Serrell

UNITED STATES PATENT OFFICE.

WALTER WALKER, OF LONDON, ENGLAND.

PROCESS OF AND APPARATUS FOR MAKING SILICATES AND HYDROCHLORIC ACID.

SPECIFICATION forming part of Letters Patent No. 474,539, dated May 10, 1892.

Application filed June 18, 1891. Serial No. 396,727. (No model.)

*To all whom it may concern:*

Be it known that I, WALTER WALKER, a subject of the Queen of Great Britain and Ireland, and a resident of London, England, have invented a certain new and useful Improved Process of and Apparatus for Obtaining Silicates for Making Glass and for the Production of Hydrochloric Acid, of which the following is a specification.

The object of this invention is to produce pure silicates for glass-making by special treatment from common sand and pure metallic chlorides and the production of hydrochloric acid as a by-product.

In carrying out my invention common sand is finely pulverized and washed with hydrochloric acid (produced in the process) for the purpose of removing any impurities detrimental to the manufacture of a high-class plate-glass. The sand when dry is thoroughly mixed with the proper proportions of dry chloride of calcium and chloride of sodium, and is then heated to a dull red heat, and steam, preferably in a superheated state, is introduced, whereon hydrochloric acid will be given off. The admission of steam is continued until all the hydrochloric acid has been evolved and no trace of it remains. The chlorides will be then decomposed and the residue will be a friable mass of pure silicates of soda and lime suitable for making in the usual manner the highest class plate-glass, bottle-glass, or any other desired quality. Thus it will be seen that in the glass material produced by this process common sand can take the place of the high-priced sand now used, chloride of calcium (which is a waste product) can take the place of lime or finely-powdered chalk, and chloride of sodium the place of sulphate or carbonate of soda. If, however, the chloride of calcium is difficult to obtain, the oxide may be used in its stead, as this material can always be readily and cheaply procured, and, if desired, the sand ordinarily used may be employed instead of the common sand. Care must be taken when determining the proportions of the mixture to always have the chlorides a little in excess of the silica (sand.) The hydrochloric acid which is given off may be collected in the usual manner practiced in the Le Blanc process, and may be sold or utilized for manufacturing bleaching-powder.

The common sand used in this process can be obtained from the seashore or elsewhere; but it is most important that it should be thoroughly pulverized (preferably wet) and well washed with some of the hydrochloric acid produced in the process, then dried and intimately mixed with the chloride of calcium and chloride of sodium prior to being heated. The chloride of calcium used can be the waste liquor obtained from the Solvay soda process, in which case the water will have to be evaporated in the usual manner before mixing with the chloride of sodium and sand. Any chloride of sodium contained in the liquor must be allowed for and deducted from the amount of chloride of sodium to be added to the mixture in the form of common salt. The chloride of calcium can also be obtained from the waste liquor from the Weldon process for making chlorine or from any other source; but in either case the water must be first evaporated.

I will now describe one way of carrying out my invention; but I wish it to be understood that I do not confine myself strictly thereto, as slight alterations in the apparatus and in the proportions of the ingredients might have to be made to suit circumstances; but what I have found most advantageous is a circular gas-fired regenerative furnace, such as shown at Figure 1 of the drawings, in which A represents the furnace fitted with a movable bottom *a*, supporting a crucible *b*, which may be of any size to contain a mixture composed of, say, sixty parts sand, thirty parts chloride of calcium, (or fifteen parts oxide of calcium,) and thirty-two parts chloride of sodium, powdered dry and well mixed together. The crucible is so arranged that it can be lowered through the bottom of the furnace by suitable means, preferably hydraulic, for the purpose of emptying it after conversion of the sand and chlorides into silicates is completed, when it is again elevated into the furnace to be recharged. When the crucible is in position in the furnace, its top enters a recess *c* in the crown of the furnace, which will form a cover for it. In this cover there are three openings, one having a tight-fitting door *d*, through which the mixture is introduced into the crucible, and two through which pass pipes $e f$, made of fire-clay, porcelain, or other suitable material. The pipe $e$ descends to near the bottom of the crucible and is open at that end and perforated with numerous small holes. It fits at top into a pipe $e'$, which is arranged around the crucible and communicates with a steam-boiler, the reason for arranging the steam-pipe around the crucible being to cause the steam to enter the crucible at the same temperature as the mixture therein. The pipe $f$ only just passes through the cover of the crucible and leads to the tower or other condenser for collecting the hydrochloric acid. The mixture is then placed in the crucible all around the pipe $e$ and is brought to a dull red heat, upon which steam is admitted, and, passing through the bottom and perforations in this pipe, thoroughly permeates the whole mass of the mixture, decomposing the chlorides, producing the silicates of soda and lime, and giving off hydrochloric acid, and upon this showing signs of decrease the heat of the furnace may with advantage be gradually raised to the vaporizing point of salt. The admission of steam is maintained until no trace of hydrochloric acid is left and the chlorides are decomposed. The hydrochloric acid escapes through the pipe $f$ and is collected in the condenser in the ordinary manner. The resulting silicates of soda and lime in the crucible are then ready to be melted down by the glass-makers in the usual way with the usual additions; or, if preferred, instead of injecting steam through a pipe placed in the crucible, as shown at Fig. 1, a perforated false bottom $g$, made of fire-clay or other suitable material, may be placed in the crucible, and the steam-pipe, which is arranged around the crucible, is led through the side or bottom thereof, so that the steam will pass through the perforated false bottom and be injected into the mixture; or steam or the products of combustion of the furnace may be exhausted through the pipe in the side or bottom or the crucible, thus drawing the steam or the products of combustion through the mixture, instead of injecting them therein. This arrangement is shown at Fig. 2.

Chloride of calcium can be used alone with the sand without the chloride of sodium, and the result will be silicate of lime which may be made into glass by the addition of the proper proportions of sand and carbonate of soda, or sulphate of soda, and when desirable suitable proportions of pulverized coke or charcoal. The hydrochloric acid given off could in this case be collected, as above described. This combination may be found advantageous to chemical works making carbonate of soda by the Solvay process, and the hydrochloric acid collected will enable them to make bleaching-powder which they cannot do economically at present.

If deemed advisable, the chloride of calcium in any desired state (or the oxide) may be thoroughly mixed with the proper proportion of sand, and then have salt, as a vapor, blown in mixed with superheated steam, or the salt may be fed in from a closed hopper by an automatic or other feeder into the top of the fire-clay pipe $e$ and be vaporized by the heat of the steam. This will enable the work to be carried on at a higher temperature, which may greatly facilitate the reactions. From experiments it appears that these reactions are the splitting up of the steam and the formation of the double silicate of soda and lime. It may also be found advantageous to take the chloride of calcium in a saturated solution, add the sand and the salt, and introduce the mixture into the crucible as a sludge and vaporize the water away before the steam is introduced, or the steam thoroughly superheated in the top of the furnace may be constantly passed into the crucible through the perforated pipe or through the bottom of the crucible in a similar manner to a Bessemer stationary converter. In this case a mixture consisting of brine and saturated solution of chloride of calcium and sand would be continuously fed into the crucible until it was full of a dry friable mass, when the admission of the mixture would be stopped, but the steam continued until all the hydrochloric acid was given off.

Having described my invention, I claim and desire to secure by Letters Patent—

1. The method herein specified of preparing sand for glass-making, consisting in mixing with the sand chloride of sodium and lime and subjecting the mass to a sufficient heat in the presence of moisture to form a silicate of soda and lime and to drive off the hydrochloric acid, substantially as specified.

2. The method herein specified of preparing sand for glass-making, consisting in pulverizing the sand and washing the same with hydrochloric acid, mixing with the sand chloride of sodium and lime, and subjecting the mass to a sufficient heat in the presence of moisture to form a silicate of soda and lime and to drive off the hydrochloric acid, substantially as specified.

3. The herein-described method of preparing sand for glass-making, consisting in mixing with the sand chloride of sodium and lime, and injecting superheated steam into the materials, substantially as and for the purposes set forth.

4. In the process of preparing sand for glass-making, mixing with the sand chloride of sodium and driving off the hydrochloric acid by the action of heat in the presence of moisture and mixing with the material soda, substantially as specified.

5. In a furnace for preparing sand for glass-making, a crucible, a movable bottom for supporting the crucible, and means for raising and lowering the same, a stationary top to the furnace with a recess for the top of the crucible to form a cover to the latter, a steam-pipe coiled around the crucible within the furnace and opening into the crucible through the top of the furnace, an escape-pipe for the hydrochloric acid, and an opening and cover for allowing for the introduction of the sand and materials to be acted upon, substantially as specified.

In witness whereof I have hereunto signed my name in the presence of two subscribing witnesses.

WALTER WALKER.

Witnesses:
WILLIAM JACKSON,
JOSEPH LAKE.